United States Patent Office 3,257,337
Patented June 21, 1966

3,257,337
PHOSPHORUS CONTAINING POLYURETHANE COMPOSITIONS
Blaine O. Schoepfle, Snyder, and Francis M. Kujawa, Tonawanda, N.Y., assignors to Hooker Chemical Corporation, Niagara Falls, N.Y., a corporation of New York
No Drawing. Filed Dec. 31, 1962, Ser. No. 248,275
18 Claims. (Cl. 260—2.5)

This invention relates to fire resistant polyurethane compositions, and to the products produced therefrom. More particularly, the invention relates to fire-resistant polyurethane foams or cellular plastic products having a phosphorus compound chemically combined therein. In still another aspect of the invention the polyurethane compositions contain both phosphorus and a halogen atom. The invention also relates to polymeric materials containing phosphorus and optionally a halogen which are useful in the preparation of polyurethane compositions.

The compositions of the invention are useful in the preparation of foamed or cellular plastic products. The polyurethane foams are useful as insulating materials in both cold and hot applications, such as in domestic refrigerators and refrigerated vehicles, as well as in insulation for hot water or steam pipes, valves and the like. The polyurethane foams are also useful as core materials between skins such as aluminum or steel or plastics of various types. The resulting sandwich-type structures are well suited for use in such diverse fields as the construction and insulation industries.

Polyurethane compositions and particularly the foamed products that are fire resistant are becoming increasingly important in industry. A fire-resistant polyurethane composition that has been particularly successful is described and claimed in co-pending application S.N. 15,516, filed March 17, 1960. In accordance with that invention, polyurethane compositions are rendered fire resistant by incorporating therein a phosphorus acid, including partially esterified phosphorus acids that contain at least one remaining unesterified acid group. The use of such phosphorus compounds not only provides excellent fire-resistance because of the phosphorus content imparted to the compositions, but also by virtue of the fact that the phosphorus compounds are chemically reacted into the compositions and, therefore, cannot be lost from the composition by evaporation, leaching, and the like. The compositions have a permanent fire resistance. In addition to providing this beneficial effect, the phosphorus acid also serves as the catalyst for the reaction of the hydroxyl-containing polymeric material and the polyisocyanate in the preparation of the polyurethane composition. Hence, it is normally unnecessary to use an additional catalytic material. It has now been found that when sufficient phosphorus acid is incorporated into the polyurethane compositions to effect the desired degree of fire resistance, the foamable compositions "rise" too rapidly to properly serve the requirements of certain applications. Hence, it becomes desirable that for certain applications, it is possible to reduce the catalytic activity in the polyurethane composition, while yet retaining the desired degree of fire resistance. Obviously, these conditions cannot be met by merely reducing the extent of incorporation of the phosphorus acid in the polyurethane composition.

Accordingly, it is an object of this invention to provide a fire-resistant polyurethane composition that is especially suitable for use in the preparation of polyurethane foams. It is another object of the invention to provide highly fire-resistant polyurethane compositions that lend themselves to use in a wide variety of applications by virtue of the fact it is possible to control the catalytic activity of the composition, while retaining the excellent fire-retarding properties. It is a further object of the invention to provide compositions that are suitable for use in the preparation of fire-resistant polyurethane foams. Further objects and advantages of the invention will become apparent from the consideration of the following detailed specification.

It has now been found that the objects of the invention can be accomplished by incorporating in polyurethane compositions not only the phosphorus acids of the previously described invention but also a neutral phosphorus compound, of a type to be described hereinafter. It has been unexpectedly found that the incorporation of a neutral phosphorus compound reduces the catalytic activity of the phosphorus acid, and thereby provides greater control over the foaming characteristics of the polyurethane composition while not adversely affecting the fire-resistant characteristics thereof. By virtue of the phosphorus content of the neutral compounds, it is also possible to reduce somewhat the proportion of phosphorus acids previously employed in polyurethane compositions, but yet retaining all the valuable properties of the earlier phosphorus-containing compositions and adding the additional advantage of better control over the foaming characteristics. The results obtained in accordance with the present invention are quite surprising in view of the teachings of the prior art which suggest that it is advantageous to avoid the use of neutral phosphorus compounds, such as the neutral phosphate esters, since these compounds normally adversely affect many of the valuable properties of polyurethane foams. It has also been found that the use of the neutral phosphorus compounds of the invention improves the mixing characteristics of the viscous components frequently used in the production of polyurethane foams. For example, the compatability of the foaming agent is improved.

In accordance with the invention, there are provided polyurethane compositions having incorporated therein: (A) a phosphorus acid, and (B) a phosphorus compound having the formula:

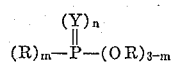

wherein $n$ is an integer from zero to one, $m$ is an integer from zero to three, Y is oxygen or sulfur, and R is selected from the group consisting of alkyl, halogen substituted alkyl, aralkyl, alkaryl and aryl. The hydrocarbon radicals preferably contain from one to twenty carbon atoms. Compounds wherein the hydrocarbon radicals join to form a ring are also contemplated, such as phenyl ethylene phosphite. The alkyl groups can be substituted with a mixture of halogen atoms, such as a mixture of chlorine and bromine atoms.

More particularly, the polyurethane compositions of the invention comprise (A) a hydroxyl-containing polymeric material having a hydroxyl number between 25 and 900, (B) a phosphorus acid, (C) a neutral phosphorus compound of the type described in the preceding paragraph and (D) an organic polyisocyanate. Generally an extraneous foaming agent is incorporated in the composition to promote foaming to an extent greater than that provided by the phosphorus acid.

The neutral phosphorus compounds that can be employed in accordance with the invention include the following compounds wherein R and Y are as defined hereinbefore:

Third degree esters of phosphoric acid (tertiary phosphates),

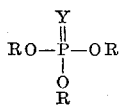

for example:

Trimethyl phosphate
Triethyl phosphate
Ethyl dimethyl phosphate
Trilauryl phosphate
Triphenyl phosphate
Tricresyl phosphate
Tribenzyl phosphate
Phenyl ethylene phosphate
Tris (β-chloroethyl) phosphate
Tris (2,3-dichloropropyl) phosphate
Tris (2,3-dibromopropyl) phosphate, and the corresponding sulfur compounds such as:

Trimethyl thionophosphate
Phenyl ethylene thionophosphate;

second degree esters of phosphonic acid (secondary phosphonates),

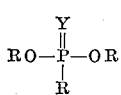

for example:

Dimethyl methylphosphonate
Diethyl methylphosphonate
Diethyl pentylphosphonate
Dilauryl methylphosphonate
Diphenyl methylphosphonate
Dibenzyl methylphosphonate
Diphenyl cresylphosphonate
Dimethyl cresylphosphonate
Bis(chloropropyl) chloropropylphosphonate
Bis(chloropropyl) propenyl-2-phosphonate,
Bis(2,3-dibromopropyl) 2,3-dibromopropyl phosphonate, and the corresponding sulfur compounds such as: dimethyl methylthionophosphonate; first degree esters of phosphinic acids (phosphinates),

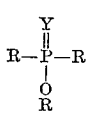

for example:

Methyl dimethylphosphinate
Methyl diethylphosphinate
Phenyl diphenylphosphinate
Benzyl diphenylphosphinate
Methyl diphenylphosphinate
Chloropropyl bis(chloropropyl)phosphinate
Butyl 2-bromoethyl phenyl phosphinate, and the corresponding sulfur compounds such as: methyl diethylthionophosphinate; tertiary phosphine oxides,

for example:

Trimethyl phosphine oxide
Triphenyl phosphine oxide
Tribenzyl phosphine oxide
Methyl diphenyl phosphine oxide
Tris (chloropropyl) phosphine oxide,
2-bromoethyl diphenyl phosphine oxide, and the corresponding sulfur compounds:

Trimethyl phosphine sulfide
2-bromoethyl diphenyl phosphine oxide;

third degree esters of phosphorous acid (tertiary phosphites),

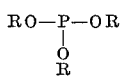

for example:

Triethyl phosphite
Tributyl phosphite
Trilauryl phosphite
Triphenyl phosphite
Tribenzyl phosphite
Phenyl ethylene phosphite
Phenyl dimethyl phosphite
Benzyl dimethyl phosphite
Tris(β-chloroethyl) phosphite
Tris(2-bromoethyl) phosphite;

second degree esters of phosphonous acids (secondary phosphonites),

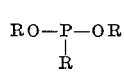

for example:

Dimethyl methylphosphonite
Diethyl pentylphosphonite
Diphenyl methylphosphonite
Dibenzyl methylphosphonite
Dimethyl cresylphosphonite
Bis(chloropropyl) chloropropylphosphonite
Bis(bromopropyl) bromopropylphosphonite;

first degree esters of secondary phosphine oxides (phosphinites),

for example:

Methyl dimethylphosphinite
Methyl diethylphosphinite
Phenyl diphenylphosphinite
Methyl diphenylphosphinite
Benzyl diphenylphosphinite
Chloropropyl bis(chloropropyl)phosphinite
2,3-dibromopropyl diphenylphosphinite;

tertiary phosphines,

for example:

Trimethyl phosphine
Triphenyl phosphine
Tribenzyl phosphine
Methyl diphenyl phosphine
Tris(chloropropyl)phosphine
2-bromoethyl diphenyl phosphine.

The term "phosphorus acids" as used in describing the acidic phosphorus compounds of the invention include not only the mineral acids such as phosphoric acid and those acids having direct carbon-to-phosphorus bonds such as the phosphonic and phosphinic acids, but also those partially esterified phosphorus acids which contain at least one remaining unesterified acid group such as the first and second degree esters of phosphoric acid and the like.

Typical phosphorus acids that can be employed in the present invention include the following compounds wherein R is as defined hereinbefore:

phosphoric acid,

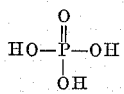

phosphorous acid,

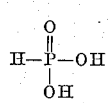

hypophosphorous acid,

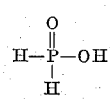

phosphonic acids,

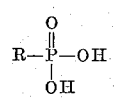

for example:

Methylphosphonic acid
Hexylphosphonic acid
Phenylphosphonic acid
Tolylphosphonic acid
Benzylphosphonic acid
2-phenylethylphosphonic acid;

phosphinic acids (secondary phosphonic acids),

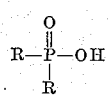

for example:

Dimethylphosphinic acid
Methylhexylphosphinic acid
Diphenylphosphinic acid
Phenylnaphthylphosphinic acid
Dibenzylphosphinic acid
Methylphenylphosphinic acid;

phosphonous acids

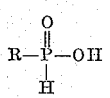

for example:

Ethylphosphonous acid
Phenylphosphonous acid
Tolylphosphonous acid
Benzylphosphonous acid;

first degree esters of phosphoric acid (primary phosphates),

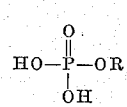

for example:

Methyl phosphoric acid
Butyl phosphoric acid
2-ethyl hexyl phosphoric acid
Phenyl phosphoric acid
Cresyl phosphoric acid
Benzyl phosphoric acid;

second degree esters of phosphoric acid (secondary phosphates),

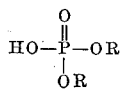

for example:

Dibenzyl phosphoric acid
Dimethyl phosphoric acid
Dibutyl phosphoric acid
Di(2-ethylhexyl)phosphoric acid
Diphenyl phosphoric acid
Methyl phenyl phosphoric acid
Phenyl benzyl phosphoric acid;

first degree esters of phosphorous acid (primary phosphites),

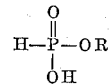

for example:

Methyl phosphorous acid
Pentyl phosphorous acid
Phenyl phosphorous acid
Cresyl phosphorous acid
Benzyl phosphorous acid;

second degree esters of phosphorous acid (secondary phosphites),

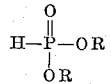

may be used with a little more difficulty due to the fact that they are very weak acids, for example:

Dimethyl phosphorous acid (dimethyl phosphite)
Methyl butyl phosphorous acid
Diphenyl phosphorous acid
Phenyl benzyl phosphorous acid
Dibenzyl phosphorous acid
Methyl phenyl phosphorous acid;

first degree esters of phosphonic acid (primary phosphonates),

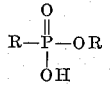

for example:

Ethyl methylphosphonic acid
Methyl butylphosphonic acid
Phenyl phenylphosphonic acid
Tolyl methylphosphonic acid
Ethyl benzylphosphonic acid;

first degree esters of phosphonous acid (primary phosphonites),

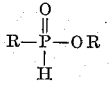

can be used with a little more difficulty due to the fact that they are very weak acids, for example:

Methyl ethylphosphonous acid
Methyl phenylphosphonous acid
Phenyl phenylphosphonous acid.

In the preparation of the polyurethane compositions of the invention, it is preferred to use a hydroxyl-containing polymeric material having a hydroxyl number between about 25 and about 900. Such a polymeric material can be a polyester, a polyether or mixtures thereof. Particularly suitable are mixtures of a polyester and a polyether wherein the polyester portion comprises at least 25 percent of the mixture. Excellent results are obtainable when less than 25 percent polyester is employed, but supplementary additives are frequently required to render such a foam self-extinguishing. It is especially preferred in the present invention to use a mixture of polyester and polyether in the ratio of 25 to 75 parts polyester to 75 to 25 parts of polyether. Generally, the hydroxyl-containing polymers of the invention have a molecular weight in the range from 200 to about 4,000.

The polyesters are the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide or mixtures thereof. The carboxylic compounds can be aliphatic, cyclo aliphatic, aromatic, or heterocyclic and either saturated or unsaturated. Among the polycarboxylic compounds which can be used to form the polyester are: maleic acid; fumaric acid; phthalic acid; isophthalic acid; terephthalic acid; tetrachlorophthalic acid; aliphatic acids such as oxalic, malonic, succinic, glutaric and adipic; 1,4-cyclohexadiene-1,2-dicarboxylic acid and the like. Additional polycarboxylic compounds which can be used to form the polyester are Diels-Alder adducts of hexahalocyclopentadiene and a polycarboxylic compound, wherein the halogen is selected from the group consisting of chlorine, bromine, fluorine and mixtures thereof, for example:

1,4,5,6,7,7-hexachlorobicyclo-(2.2.1)-5-heptene-2,3-dicarboxylic acid;
1,4,5,6-tetrachloro-7,7-difluorobicyclo-(2.2.1)-5-heptene-2,3-dicarboxylic acid;
1,4,5,6,7,7-hexabromobicyclo-(2.2.1)-5-heptene-2,3-dicarboxylic acid;
1,4,5,6-tetrabromo-7,7-difluorobicyclo-(2.2.1)-5-heptene-2,3-dicarboxylic acid;

and the like. Mixtures of any of the above polycarboxylic compounds can be employed.

In order to obtain a satisfactory rigid foam, at least a portion of the total polyhydric alcohol component should consist of a polyhydric alcohol containing at least three hydroxyl groups. This is desired to provide a means for branching the polyester. Where an even more rigid structure is desired, the whole alcohol component may be made up of a trifunctional alcohol such as glycerol. Where a less rigid final product is desired, a difunctional polyhydric alcohol such as ethylene glycol or 1,4-butanediol may be utilized as that part of the polyhydric alcohol component. Other glycols such as diethylene glycol, triethylene glycol, propylene glycol, dipropylene glycol, other polypropylene glycols, butylene glycols, polybutylene glycols, and the like can also be used. Among the polyhydric alcohols which can be used are glycerol, hexanetriol, butanetriol, trimethylol propane, trimethylol ethane, pentaerythritol, mannitol, sorbitol, cyclohexanediol-1,4, glycerol monoethyl ether and the like. The ratio of the polyhydric alcohol such as glycerol to the polybasic acid can be expressed as the hydroxyl-carboxyl ratio, which can be defined as the number of moles of hydroxyl groups to the number of moles of carboxyl groups in a given weight of resin. This ratio may be varied over a wide range. Generally, however, a hydroxyl-carboxyl ratio of between 1.5:1 to 5:1 is needed.

Instead of employing a polycarboxylic compound which is Diels-Alder adduct of hexahalocyclopentadiene and a polycarboxylic compound, a polyhydric alcohol which is a Diels-Alder adduct of hexahalocyclopentadiene and a polyhydric alcohol can be used. This is done by employing (A) a polyester resin comprised of the reaction product of (1) an adduct of hexahalocyclopentadiene and a polyhydric alcohol containing aliphatic carbon-to-carbon unsaturation, (2) a polycarboxylic compound and (3) a polyhydric alcohol containing at least three hydroxyl groups. Typical adducts include: 2,3-dimethylol-1,4,5,6,7,7-hexachlorobicyclo-(2.2.1)-5-heptene; and 2,3-dimethylol - 1,4,5,6 - tetrachloro - 7,7-difluorobicyclo - (2.2.1)-5-heptene. Similar compounds are disclosed in U.S. Patent 3,007,958.

Where aromatic or bicyclo carboxylic compounds are used, aliphatic acids are sometimes incorporated into the polyester resin. Adipic acid is generally preferred for this purpose, although other suitable acids may be used such as oxalic, malonic, succinic, glutaric, pimelic, suberic, azelaic, etc. Unsaturated acids such as maleic, fumaric, itaconic, citraconic, aconitic, etc., can also be used.

The preferred polyesters of the present invention are those which contain an adduct of hexahalocyclopentadiene co-reacted in the polyester portion in view of the fact that they contain a large amount of stable chlorine, thereby enhancing the flame-retardant characteristics of the resultant foam. Particularly preferred are those polyesters wherein the adduct is reacted in the polycarboxylic portion of the polyester, due to lower cost and commercial availability of the polycarboxylic adducts of hexahalocyclopentadiene.

The polyethers employed are known in the art, and are the reaction products of (1) either a polyhydric alcohol, a polycarboxylic acid or a polyphenolic compound, and (2) a monomeric 1,2-epoxide possessing a single 1,2-epoxy group, such as, for example, propylene oxide. The polyhydric alcohols and polycarboxylic acids which may be employed are any of the polyhydric alcohols and polycarboxylic acids hereinbefore listed. Polyphenolic compounds which can be employed are the reaction products of phenolic compounds with aldehydes, such as phenol-formaldehyde resins. Examples of monomeric 1,2-epoxides include ethylene oxide, propylene oxide, butylene oxide, isobutylene oxide, 2,3-epoxyhexane, 3-ethyl-2,3-epoxyoctane, epichlorohydrin, epibromohydrin, styrene oxide, glycidyl ether, methyl glycidyl ether, phenyl glycidyl ether, butyl glycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate, and the like. The preferred monoepoxides are the monoepoxide substituted hydrocarbons, the monoepoxy-substituted ethers, sulfides, sulfones and esters wherein the said compounds contain no more than eighteen carbon atoms. A lower alkylene oxide is preferably employed in rigid foams as the higher counterparts yield flexible rather than rigid products.

A large number of various organic polyisocyanates can be used. Of the hydrocarbon polyisocyanates, the aryl and alkaryl polyisocyanates of the benzene and naphthalene series are more reactive and less toxic than the aliphatic members. Consequently, the aromatic compounds are preferred in the present invention. The preferred compounds which are at present most readily available commercially are 2,4-tolylene diisocyanate, 2,6-tolylene diisocyanate and mixtures thereof. However, others may be used, among them Phenyl diisocyanate;
Alpha-naphthyl diisocyanate;
4-tolylene diisocyanate;
n-Hexyl diisocyanate;
Methylene-bis-(4-phenyl isocyanate);
3,3'-bitolylene-4,4'-diisocyanate;
3,3'-dimethoxy-4,4'-biphenylene diisocyanate;
1,5-naphthalene diisocyanate;
2,4-chlorophenyl diisocyanate;
Hexamethylene diisocyanate;
Ethylene diisocyanate;
Trimethylene diisocyanate;
1,3-cyclopentylene diisocyanate;
1,2-cyclohexylene diisocyanate;
1,4-cyclohexylene diisocyanate;
Cyclopentylidene diisocyanate;
Cyclohexylidene diisocyanate;
p-Phenylene diisocyanate;
m-Phenylene diisocyanate;

4,4'-diphenyl propane diisocyanate;
4,4'-diphenyl methane diisocyanate;
1-methyl-2,4-phenylene diisocyanate;
4,4'-diphenylene diisocyanate;
1,2-propylene diisocyanate;
1,2-butylene diisocyanate;
Ethylidene diisocyanate;
Propylidene diisocyanate;
Butylidene diisocyanate;
1,3,5-benzene triisocyanate;
2,4,6-tolylene triisocyanate;
2,4,6-monochloro benzene triisocyanate;
4,4',4''-triphenylmethane triisocyanate;

Polymethylene polyphenylisocyanate and mixtures thereof. Higher isocyanates are provided by the liquid reaction products of (1) diisocyanates and (2) polyols or polyamines; etc. In addition, isothiocyanates and mixtures of isocyanates may be employed. Also contemplated are the many impure or crude polyisocyanates that are commercially available, such as crude mixtures of methylene bis(4-phenylisocyanate).

Although not generally preferred when using the phosphorus acids, conventional reaction catalysts can also be used in producing the polyurethane compositions. The catalyst employed can be any of the known conventional catalysts for isocyanate reactions, such as tertiary amines, for example, triethylamine, N-methyl morpholine, triethanolamine, etc., or antimony compounds such as antimony caprylate, antimony naphthenate, or antimonous chloride. In addition, tin compounds can be employed such as dibutyltin dilaurate, tri-n-octyltin oxide, hexabutylditin, tributyltin phosphate, or stannic chloride. Rigid or flexible polyurethane foams are thereby obtained. The rigid polyurethane foams utilize a highly branched hydroxyl rich polyester or polyether having a hydroxyl number of between about two hundred and nine hundred and fifty. The flexible polyurethane foams utilize a linear relatively hydroxyl poor polyester or polyether having a hydroxyl number of between about thirty and one hundred. If a polyester or polyether with a hydroxyl number between about one hundred and two hundred is employed, a semi-rigid polyurethane foam is usually obtained.

Any foaming agent commonly used in the art can be employed. Foaming agents in this art are generally those materials that are capable of liberating gaseous products when heated, or when reacted with an isocyanate. Preferably foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of twenty to fifty degrees centigrade, and mixtures thereof, for example, tricholrofluoromethane, trichlorotrifluoroethane, dichloromonofluoromethane, monchloroethane, monochloromonofluoroethane, difluoromonochloroethane, and difluorodichloroethane.

Another foaming system that is suitable for carrying out the foaming reaction at an elevated temperature is found in United States Patent 2,865,869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1-phenylethanol; and 1,1,2,2-tetraphenylethanol, etc. Examples of catalysts include: sulfuric acid; phosphoric acid; sulfonic acid; and aluminum chloride; etc. In addition, various secondary alcohols and glycols may be used as: 1-phenyl-1,2-ethanediol; 2-butanol; etc. Generally, secondary alcohols should be used with strong concentrated acid catalysts as above; however, certain secondary alcohols may be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetrahydroxy methylphosphonium chloride. In addition, mixtures of the above foaming agents can be employed.

In preparing the polyurethane compositions of this invention, the hydroxyl containing polymer and polyisocyanate are preferably reacted in a ratio sufficient to provide about eighty-five to one hundred and fifteen percent of isocyanato groups with respect to the total number of hydroxyl and carboxyl groups present in the hydroxyl-containing polymeric material (and the foaming agent, if one is provided). The reaction temperature generally ranges from about twenty to about one hundred and twenty degrees centigrade, although higher and lower temperatures can be used.

The phosphorus acids of the invention are employed in amounts from about 2 to 20 parts by weight per hundred parts of hydroxyl-containing polymer. The preferred amount is from about 4 to about 15 parts by weight per hundred of polymer. The neutral phosphorus compound of the invention is employed in amounts of at least about 0.5 part and preferably from about 1 to 15 parts by weight per hundred parts of the hydroxyl-containing polymer. The preferred amount of the neutral phosphorus compound is from about 2 to about 10 parts by weight per hundred parts polymer. It is preferred to add the phosphorus compounds directly to the hydroxyl-containing polymer in order to reduce the viscosity, and subsequently add the polyisocyanate and foaming agent; however, excellent results are obtainable when all the components are simultaneously mixed together, or when the phosphorus compound or compounds is prereacted with the isocyanate component.

Various additives can be incorporated which may serve to provide different properties. For instance, antimony oxide may be used to improve fire-resistance, fillers, such as clay, calcium sulfate or ammonium phosphate may be added to lower cost, and improve density and fire-resistance; ingredients such as dyes may be added for color, and fibrous glass, asbestos, or synthetic fibers may be added for strength.

The following examples will serve to illustrate the present invention, but are not intended to limit it. All parts are by weight unless indicated otherwise.

In these examples the foaming characteristics of a number of compositions were examined to determine the effect of employing the invention. Of principal concern here is a property known as the "rise time" of the foamable composition. The "rise time" is defined as the time interval between deposition of the foamable mixture in the mold and the last detectible expansion of the mixture. The relative rise times of various foamable mixtures is most readily determined in the laboratory by measuring the "tack-free time" of the foamable composition. The "tack-free time" is defined as the time interval after deposition of the foamable mixture in the mold that the foam is tacky to the touch. This measure of the foaming characteristics of the foamable compositions has been used in the following examples:

*Example 1*

A mixture of hydroxyl-containing polymers was prepared by mixing the following components:

65 parts of a polyester containing two moles of trimethylol propane to one mole of 1,4,5,6,7,7-hexachlorobicyclo-(2.2.1)-5-heptene-2,3-dicarboxylic anhydride, and having a hydroxyl number of about 400.

25 parts of a polyether comprised of the reaction product of a phenol-formaldehyde resin and ethylene oxide, and having a hydroxyl number of about 350.

5 parts of a mixture of about 50 percent mono (2-ethylhexyl) acid phosphate and about 50 percent di(2-ethylhexyl) acid phosphate.

30 parts of trichlorofluoromethane.

To this composition was added 64 parts of a crude, commercial mixture of tolylene diisocyanate isomers, and 0.5 part of a silicone-glycol copolymer cell controller (designated L-530 by the manufacturer, Union Carbide Corporation). The mixture was agitated vigorously for 40 seconds and poured into a mold. A foam having a fine cell structure resulted. The tack-free time was 5.5 minutes. The foam was cured at 80 degrees centigrade in 10 minutes.

Examples 1–7

In these examples, quantities of tris($\beta$-chloroethyl) phosphate were incorporated into the mixture of hydroxyl-containing polymer of Example 1 together with the same quantity of the acid phosphate mixture of Example 1. The proportions of tris($\beta$-chloroethyl)phosphate ranged from 0.75 to 10 parts by weight of phosphate per hundred parts of hydroxyl containing polymer. Polyurethane foams were prepared from the compositions by the same procedure used in Example 1. The tack-free time was determined for each foam. In some cases, the compositions were foamed in large scale foaming machines and the rise time for these foams was measured. The results are shown in Table 1, which also includes the results from Example 1.

position was employed to make a polyurethane foam as in Example 1. The tack-free time was measured and compared with that of a composition that was identical except for the omission of the tertiary phosphate. Following are the tack-free times:

|  | Tack-free time (min.) |
|---|---|
| Composition with 2.5 parts tris($\beta$-chloroethyl)phosphate | 4.25 |
| Composition with no tris($\beta$-chloroethyl)phosphate | 2.75 |

Examples 9–23

In Example 9, the procedure of Example 1 was repeated and the composition had a tack-free time of 6 minutes. Then a series of compositions were prepared in which all the components were the same as in Example 9 except that one of the following phosphorus compounds was also incorporated into the composition: triethyl phosphite, tricresyl phosphate, bis(chloropropyl) chloropropylphosphonate, phenyl ethylene phosphite, triphenyl phosphite, trimethyl thionophosphate, bis(2,3)-dibromopropyl)2,3-dibromopropylphosphonate, and tris(2,3-dibromopropyl)phosphate. The tack-free times of all

TABLE 1

| Example No. | 2-Ethylhexyl Phosphate (Parts/100 parts polymer) | Tris($\beta$-chloroethyl) Phosphate (Parts/100 parts polymer) | Tack-free Time (Minutes) | Rise Time (Seconds) | Fire Retardance [1] (Inch/minute) |
|---|---|---|---|---|---|
| 1 | 5 | None | 5.5 | 120 | 0.8 |
| 2 | 5 | 0.75 | 6.25 | | |
| 3 | 5 | 1.25 | 7.5 | | |
| 4 | 5 | 2.5 | 8.25 | 180 | 0.6 |
| 5 | 5 | 5.0 | 7.5 | 175 | 0.4 |
| 6 | 5 | 7.5 | 8.25 | | |
| 7 | 5 | 10 | 9.0 | | |

[1] Determined by ASTM D-757-49.

TABLE 2

| Example No. | Neutral Phosphorus Compound Name | (Parts/100 parts polymer) | Tack-free Time (Minutes) | Fire Retardance (inches/min.) |
|---|---|---|---|---|
| 9 | None | | 6.0 | 0.97 |
| 10 | Triethyl phosphite | 1.25 | 7.0 | |
| 11 | Triethyl phosphite | 2.5 | 7.5 | |
| 12 | Triethyl phosphite | 5.0 | 8.0 | 0.76 |
| 13 | Tricresyl phosphate | 1.25 | 7.0 | |
| 14 | Tricresyl phosphate | 2.5 | 7.75 | |
| 15 | Tricresyl phosphate | 5.0 | 9.5 | 0.85 |
| 16 | Bis(chloropropyl) chloropropyl phosphonate | 1.25 | 7.5 | |
| 17 | Bis(chloropropyl) chloropropyl phosphonate | 2.5 | 7.5 | |
| 18 | Bis(chloropropyl) chloropropyl phosphonate | 5.0 | 8.5 | 0.67 |
| 19 | Phenyl ethylene phosphite | 5.0 | 8.0 | 0.75 |
| 20 | Triphenyl phosphite | 5.0 | 9.5 | 0.89 |
| 21 | Trimethylthionophosphate | 5.0 | 10.5 | 0.82 |
| 22 | Bis(2,3-dibromopropyl) 2,3-dibromopropyl phosphonate | 5.0 | 9.0 | 0.5 |
| 23 | Tris(2,3-dibromopropyl) phosphate | 5.0 | 8.5 | 0.9 |

The data in Table 1 show that when the concentration of the phosphorus acid in the polyurethane composition is held constant, the foaming characteristics of the compositions can be controlled by incorporating the neutral phosphorus ester at selected levels.

Example 8

The hydroxyl-containing polymer of Example 1 was mixed with 10 parts by weight (per hundred parts of polymer) of a mixture of about 50 percent monobutyl acid phosphate and 50 percent dibutyl acid phosphate, and 2.5 parts of tri($\beta$-chloroethyl) phosphate. The comthe compositions were measured and the results are shown in Table 2 together with the results from Example 9.

The results in Table 2 show that additional compounds of the invention can be used for controlling the foaming characteristics of polyurethane compositions.

The foaming characteristics of polyurethane compositions containing the hydroxyl containing polymers set forth in the following Examples 24 to 30 are modified in a manner similar to that indicated in the foregoing examples, when a phosphorus acid and a neutral phosphorus compound of the invention are incorporated therein.

| Example No. | Hydroxyl-containing Polymer |
|---|---|
| 24 | 6 moles adipic acid. 10 moles trimethylolpropane. Acid number: less than 1. Hydroxyl number: 504. |
| 25 | Polypropylene glycol. Molecular weight: about 2,000. Hydroxyl number: 56. |
| 26 | 4 moles 1,4,5,6,7,7-hexachlorobicyclo-(2.2.1)-5-heptene-2,3-dicarboxylic acid. 7.6 moles glycerol. 2 moles adipic acid. Acid number: 5. Hydroxyl number: 265. |
| 27 | 3 moles adipic acid. 5 moles glycerol. Acid number: 1. Hydroxyl number: 640. |
| 28 | 1 mole trimethylolpropane. 6 moles propylene oxide. Hydroxyl number: 392. |
| 29 | 8.8 moles trimethylolpropane. 5 moles adipic acid. 1 mole phthalic anhydride. Acid number: less than 1. Hydroxyl number: 435. |
| 30 | 1 mole 1,4,5,6,7,7-hexachlorobicyclo-(2.2.1)-5-heptene-2,3-dicarboxylic acid. 4 moles propylene oxide. Acid number: 0. Hydroxyl number: 202. |

While the invention has been described with reference to certain specific embodiments, it will be recognized by those skilled in the art that many variations are possible without departing from the spirit and scope of the invention.

We claim:

1. A composition of matter comprising (A) a hydroxyl-containing polymer having a hydroxyl number from 25 to 900, (B) a phosphorus acid which contains at least one unesterified acid group in a proportion from about 2 to 20 parts by weight per hundred parts of hydroxyl-containing polymer, and (C) a neutral phosphorus compound having the following formula:

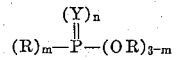

wherein $n$ is an integer from zero to one, $m$ is an integer from zero to three, Y is selected from the group consisting of oxygen and sulfur, and R is selected from the group consisting of alkyl, halogen-substituted alkyl, aralkyl, alkaryl and aryl, in a proportion from about 1 to 15 parts by weight per hundred parts of hydroxyl-containing polymer.

2. The composition of claim 1 wherein the hydroxyl-containing polymer comprises a polyester comprised of the reaction product of a polyhydric alcohol and a polycarboxylic compound.

3. The composition of claim 1 wherein the hydroxyl-containing polymer comprises a mixture of a polyester comprised of the reaction product of a polyhydric alcohol and a polycarboxylic compound, and a polyether comprised of the reaction product of a monomeric 1,2-epoxide and a material selected from the group consisting of a polyhydric alcohol, a polycarboxylic acid and a polyphenolic compound.

4. The composition of claim 2 wherein the polycarboxylic portion of said polyester contains an adduct of hexahalocyclopentadiene and a polycarboxylic compound.

5. The composition of claim 1 wherein the phosphorus compound (C) is a tertiary phosphate.

6. The composition of claim 5 wherein the tertiary phosphate is tris(β-chloroethyl)phosphate.

7. The composition of claim 5 wherein the tertiary phosphate is tricresyl phosphate.

8. The composition of claim 5 wherein the tertiary phosphate is trimethyl thionophosphate.

9. The composition of claim 1 wherein the phosphorus compound (C) is a secondary phosphonate.

10. The composition of claim 9 wherein the secondary phosphonate is bis(chloropropyl) chloropropylphosphonate.

11. The composition of claim 1 wherein the phosphorus compound (C) is a tertiary phosphite.

12. The composition of claim 11 wherein the tertiary phosphite is triethylphosphite.

13. The composition of claim 1 wherein the phosphorus acid is a mixture of monobutyl acid phosphate and dibutyl acid phosphate.

14. The composition of claim 1 wherein the phosphorus acid is a mixture of mono(2-ethylhexyl) acid phosphate and di(2-ethylhexyl) acid phosphate.

15. A process which comprises reacting (A) hydroxyl-containing polymer having a hydroxyl member from about 25 to 900, (B) an organic polyisocyanate, and (C) a phosphorus acid having at least one unesterified acid group in a proportion from about 2 to 20 parts by weight per hundred parts of hydroxyl-containing polymer, in the presence of (D) a phosphorus compound having the following formula:

wherein $n$ is an integer from 0 to 1, $m$ is an integer from 0 to 3, Y is selected from the group consisting of oxygen and sulfur, R is selected from the group consisting of alkyl, halogen-substituted alkyl, aralkyl, alkaryl and aryl, in a proportion from about 1 to 15 parts by weight per hundred parts of hydroxyl-containing polymer, and (E) a foaming agent.

16. The process of claim 15 wherein the phosphorus compound (C) is tris(β-chloroethyl) phosphate.

17. The process of claim 15 wherein the phosphorus acid is a mixture of monobutyl acid phosphate and dibutyl acid phosphate.

18. The process of claim 15 wherein the phosphorus acid is a mixture of mono(2-ethylhexyl) acid phosphate and di(2-ethylhexyl) acid phosphate.

References Cited by the Examiner

UNITED STATES PATENTS

| | | | |
|---|---|---|---|
| 2,589,326 | 3/1952 | Oberright | 260—461 XR |
| 2,602,783 | 7/1952 | Simon | 260—2.5 |
| 2,794,821 | 6/1957 | Loughran et al. | 260—461 |
| 3,034,996 | 5/1962 | Kaplan | 260—2.5 |
| 3,061,625 | 10/1962 | Friedman | 260—2.5 |
| 3,067,149 | 12/1962 | Dombrow et al. | 260—2.5 |
| 3,075,928 | 1/1963 | Lanham | 260—2.5 |
| 3,100,752 | 8/1963 | Dombrow | 260—2.5 |
| 3,102,825 | 9/1963 | Rogers et al. | 260—2.5 |
| 3,131,115 | 4/1964 | Robitschek et al. | 260—2.5 XR |
| 3,134,742 | 5/1964 | Wismer et al. | 260—2.5 |

FOREIGN PATENTS

| | | |
|---|---|---|
| 598,678 | 1/1961 | Belgium. |
| 1,297,489 | 5/1962 | France. |

LEON J. BERCOVITZ, *Primary Examiner.*

DONALD E. CZAJA, *Examiner.*

J. J. KLOCKO, *Assistant Examiner.*